(12) United States Patent
Wang et al.

(10) Patent No.: US 7,379,672 B2
(45) Date of Patent: May 27, 2008

(54) PHOTONIC RF DISTRIBUTION SYSTEM (75) Inventors: Wenshen Wang, Torrance, CA (US);
David C. Scott, Lakewood, CA (US);
Thomas Jin-Ming Jung, Rolling Hills Estates, CA (US); Joseph Morais, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 543 days.

(21) Appl. No.: 11/054,832

(22) Filed: Feb. 10, 2005

(65) Prior Publication Data
US 2005/0201759 A1 Sep. 15, 2005

(51) Int. Cl.
*H04B 10/00* (2006.01)
(52) U.S. Cl. .................. 398/115; 398/82; 398/182; 398/183; 398/79; 398/90; 398/91; 398/93; 398/95; 398/154; 398/155; 398/162; 398/163; 398/192; 398/193; 398/194; 398/195; 398/196; 398/197; 398/118; 385/3; 385/4; 385/5; 385/2; 385/8; 385/9; 385/15; 385/27; 385/31; 385/14; 372/28; 372/29.01; 372/32; 372/18; 372/20; 356/451; 356/484
(58) Field of Classification Search .............. 398/183, 398/115, 90, 93, 95, 192, 193, 194, 195, 196, 398/79, 82, 154, 155, 162, 163, 118, 91, 182; 372/32, 28, 29.01, 18, 20; 385/3, 2, 4, 8, 385/9, 14, 15, 27, 31; 356/451, 484
See application file for complete search history.

(56) References Cited

U.S. PATENT DOCUMENTS 5,396,361 A 3/1995 Sasaki et al.

6,766,070 B2 * 7/2004 Williams et al. .............. 385/3
6,807,203 B2 * 10/2004 Adams .................... 372/32
2003/0112836 A1 6/2003 Kim et al.

FOREIGN PATENT DOCUMENTS

DE 196 25 817 1/1998

OTHER PUBLICATIONS

B. Jensen and L.G. Kozovsky; Relative Frequency Stabilization of a Set of Lasers Using Optical Phase-Locked Loops; pp. 535-538; TFL Telecommunications Research Laboratory; Horsholm, Denmark.
Jensen, B. et al., "Relative Frequency Stabilization of a set of Lasers Using Optical Phase-Locked Loops," Proceedings of the European Conference on Optical Communication, Sep. 1990, pp. 535-538, vol. 1, Amsterdam, Denmark.

* cited by examiner

*Primary Examiner*—Hanh Phan
(74) *Attorney, Agent, or Firm*—Patti, Hewitt & Arezina LLC (57) ABSTRACT The present photonic RF generation and distribution system provides a system and method for distributing an RF output signal. The photonic RF distribution system includes two optical sources for generating optical signals. A first optical source (42) is operable to generate a first optical signal having an operating frequency. A second optical source (44) is operable to generate a second optical signal having an operating frequency. A modulator (46) is operable to impress an RF modulation signal on a tapped portion of the first optical signal such that a modulated signal is generated. A first coupler (52) combines the modulated signal with a tapped portion of the second optical signal, thereby forming a combined signal having a difference frequency component. A control photodetector (50) is responsive to the combined signal to generate a tone signal. An offset locking circuit (56), responsive to the tone signal, controls the operating frequency of the optical sources (42 and 44) such that the first optical signal and the second optical signal are frequency locked.

25 Claims, 6 Drawing Sheets

PHOTONIC RF DISTRIBUTION SYSTEM

BACKGROUND OF THE INVENTION

1. Field of the Invention

The present invention relates generally to photonic links, and in particular to photonic RF links.

2. Discussion of the Related Art

Photonic RF links have been demonstrated for antenna remoting, RF distribution and CATV broadcasting. An externally modulated photonic RF link, consisting of a high power laser source, a modulator and a photodetector, has superior performance over a directly modulated link. In an externally modulated photonic link, the link gain and spur free dynamic range (SFDR) have been largely limited by the modulators. Low modulation voltage, low optical insertion loss, high power handling capability, and linearized transfer function are all of critical importance to the link performance. The bandwidth of the modulator also has to match to the desired link bandwidth, leading to many difficult design trade-offs. Conventional modulator technology is not able to simultaneously meet all of the desired performance specifications.

For RF power distribution or remoting, a photonic RF source is a viable substitute for conventional externally modulated photonic RF links. In order to obtain high quality RF signals through photonic generation, a phase locked loop (PLL) is commonly introduced to control the random phase drift between the lasers. In these systems, the generated RF signal can be used to compare to a reference signal from a synthesizer, and the phase error voltage will be used to adjust the laser frequency, which functions as a photonic voltage controlled oscillator (VCO). For extended frequency tuning range, external RF mixers can be introduced to down convert the generated RF signal.

A photonic RF source can be tuned over a very broad bandwidth by virtue of the large frequency difference between the optical wave and the RF wave, subject to the availability of high speed photodetectors. The PLL, however, typically presents the limiting factor for broadband tunability, since external RF (microwave) mixers are limited at around 40 GHz. Commercial phase detectors are limited with a bandwidth lower than 1 GHz due to the response limit of current CMOS technology. Thus, there exists a need for a photonic RF generation system with improved bandwidth capabilities.

SUMMARY OF THE INVENTION

The present photonic RF generation and distribution system provides a system and method for distributing an RF output signal. The photonic RF distribution system includes two optical sources for generating optical signals. A first optical source is operable to generate a first optical signal having an operating frequency. A second optical source is operable to generate a second optical signal having an operating frequency. A modulator is operable to impress an RF modulation signal on a tapped portion of at least one of the first optical signal, the second optical signal, or both such that a modulated signal is generated having a difference frequency component. A control photodetector is responsive to the modulated signal to generate a tone signal. An offset locking circuit, responsive to the tone signal, controls the operating frequency of the optical sources such that the first optical signal and the second optical signal are frequency locked.

For a more complete understanding of the invention, its objects and advantages, reference may be had to the following specification and to the accompanying drawings.

DETAILED DESCRIPTION OF THE PREFERRED EMBODIMENT

Figure 1:
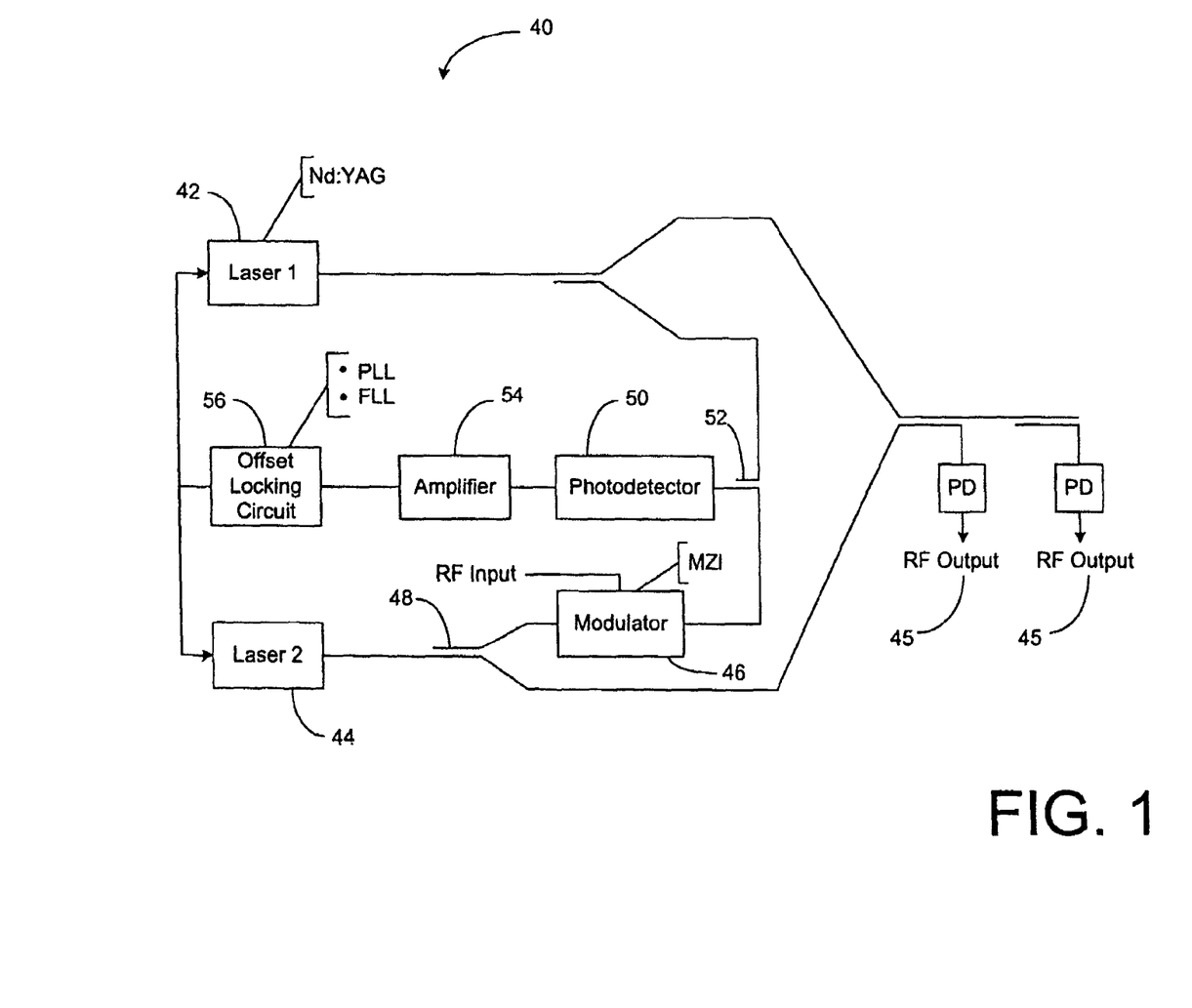
FIG. 1 illustrates a block diagram of a first embodiment of a photonic RF distribution system in accordance with the teachings of the invention.

Referring to FIG. 1, a first embodiment of a photonic RF source 40 according to the present invention is shown. The photonic RF source 40 is particularly suitable for RF photonic distribution. The photonic RF source 40 includes a first laser 42 and a second laser 44 for generating optical signals that beat against one another to produce one or more RF output signals 45. The lasers 42 and 44 are preferably Nd:YAG lasers tuned to a wavelength of 1.319 um, lasing at frequencies of v1 and v2 respectively. In the presently preferred embodiment, both of the lasers 42 and 44 are tunable so that a wider tuning range is attainable. However, the scope of the invention includes tuning merely one of the lasers 42 and 44 to maintain the desired RF output signal. By tuning both lasers 42 and 44, a tuning range of 50 GHz is attainable.

A modulator 46 is coupled to the second laser 44 through an optical coupler 48. Also coupled to the modulator 46 is an input RF signal at $\Omega$ which is used to modulate a small portion of the optical signal from the second laser 44. Preferably, an intensity modulator such as a Mach-Zehnder modulator is employed. However, the scope of the invention includes using other modulators that modulate other characteristics of the optical signal such as phase and frequency. The modulator 46 acts as a photonic mixer that down converts the $\Delta\omega$ tone using $\Omega$ as the local oscillator. As a result, the performance requirements on the RF components in the control loop are greatly reduced.

The output of the modulator 46 is coupled to a photodetector 50. The photodetector is also coupled through an optical coupler 52 to the first laser 42. The combined optical signal from the modulator 46 and the first laser 42 is sent to the photodetector 48 which is used to detect the beat frequency of the second laser 44 and the lower sideband of the first laser 42. The photodetector 48 emits a difference signal corresponding to the detected frequency. In the presently preferred embodiment of the invention, a low bandwidth photodetector is employed to additionally attenuate the upper sidebands.

A low noise amplifier 54 amplifies the difference signal from the photodetector 50 and sends the amplified signal to an offset locking circuit 56 such as a phase locked loop, PLL. Although the difference signal is preferably amplified by the amplifier 54, it is within the scope of the invention to directly couple the difference signal to the PLL 56.

In response to the difference signal, the PLL 56 controls the two lasers 42 and 44 by temperature tuning and by adjusting the cavity and pump power. The PLL 56 is constructed in accordance with well known design principles to control the frequency difference between the lasers 42 and 44. In addition to using the PLL 56, the scope of the invention also includes using other circuits for offset-frequency locking such as optical frequency locked loops (OFLL). For a description of an OFLL see Laser Offset-Frequency Locking Using A Frequency-To-Voltage Converter, by T. Stace et. al, in Meas. Sci. Technol. 9 (1998) 1635-1637, printed in the UK, which is hereby incorporated by reference in its entirety.

The output of the lasers 42 and 44 is combined and fed to multiple RF outputs 45 which are used for array applications.

In operation, one of the optical signals from the lasers 42 and 44 is coupled through the modulator 46. The modulator 46 modulates a small portion of the optical signal with an RF modulation frequency, $\Omega$. Due to the input frequency range of the PLL, the modulation frequency, $\Omega$, should satisfy the following equation:

$$|V_1 - V_2| > IF$$

where IF is the desired frequency of the feedback signal and should be less than operating range of the PLL 56 which in the present case is 1 GHz.

The modulated signal is then mixed at the photodetector 50 with a portion of the other optical signal. The generated sideband tones contain a component at $\Delta\omega - \Omega$. The sideband tone can be at a lower frequency even when both $\Delta\omega$ and $\Omega$ are very high. Here, the modulator 46 acts as a photonic mixer that down converts the $\Delta\omega$ tone using $\Omega$ as the local oscillator. As a result, the performance requirements on the RF components in the control loop are greatly reduced. The phase information of the optical signals is contained in the down converted signal, and can be used by the PLL 56 to generate the control feedback signal for the lasers 42 and 44. The lasers 42 and 44 are locked at a frequency difference of $\Delta\omega$, in which the offset $\Omega - \Delta\omega$ is controlled by the PLL 56.

Figure 2:
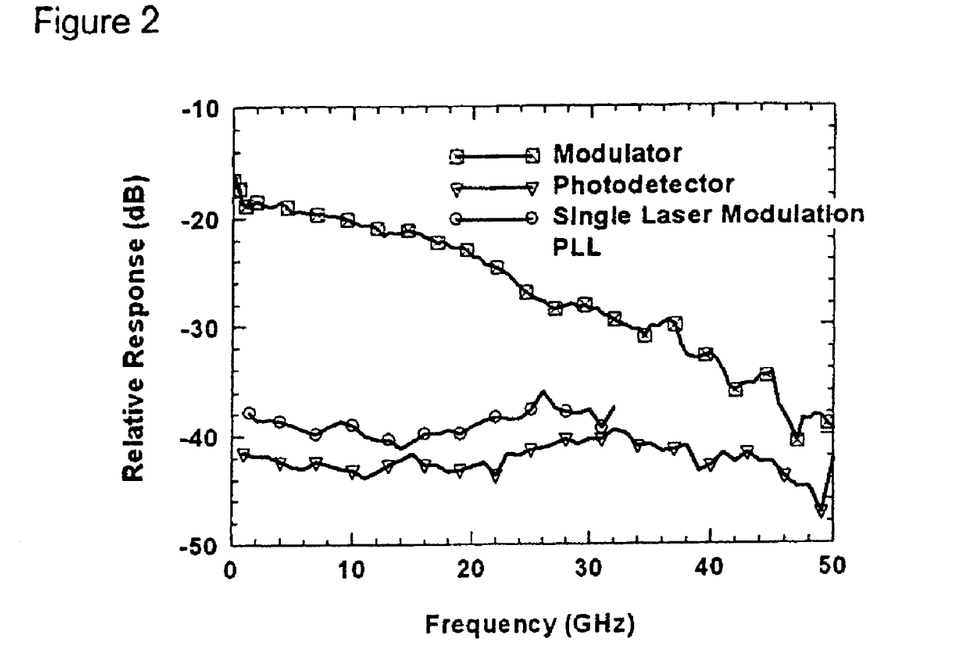
FIG. 2 illustrates the measured frequency response of the first embodiment of the RF distribution system.

The measured frequency response of the RF distribution system 40 is shown in FIG. 2. The frequency of the feedback signal was chosen to be 500 MHz and is kept constant throughout the measurement. The RF power used to drive the modulator 46 is also kept constant. The frequency response of the modulator 46 and the measuring PD is plotted for comparison to the phase locked frequency of the two lasers 42 and 44. Optical power incident on the PD is preferably adjusted such that the power from each laser is equal to achieve a high modulation depth. Total optical power incident on the measuring PD is also kept constant. As the lasers 42 and 44 are tuned, mode hopping is observed and the optical power in the mode of interest changes causing the power in the RF tone to fluctuate with offset frequency.

Figure 3:
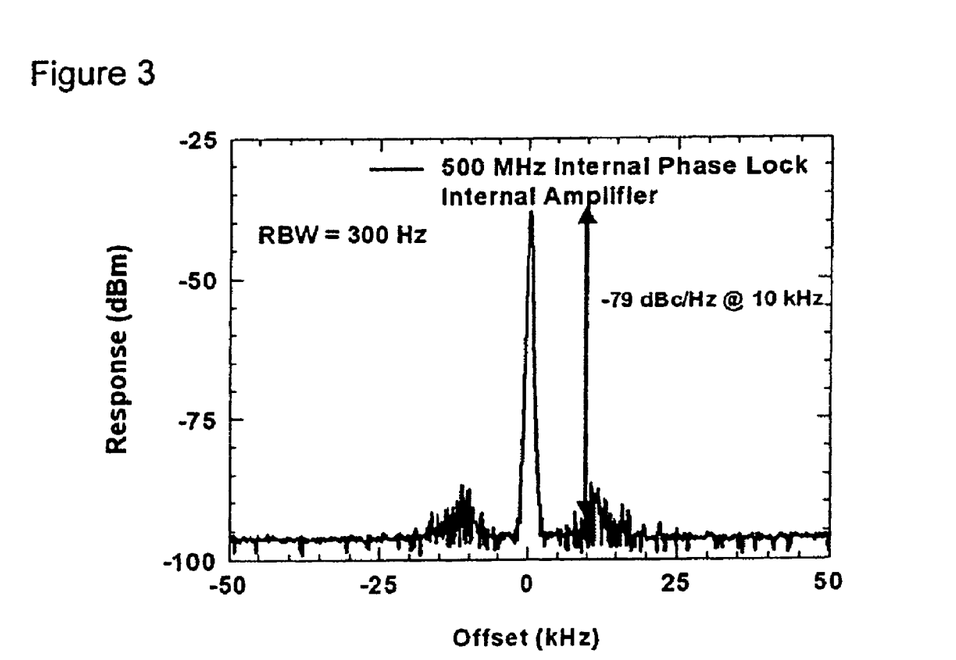
FIG. 3 illustrates the noise performance of a phase locked loop used in the first embodiment of the RF distribution system.

Another feature of the RF distribution system 40 is not only the power of the phase locked tone, but also the noise performance of the system at higher frequencies. Shown in FIG. 3 is the noise performance of the PLL 56 without any external mixers or any external amplifiers. The frequency difference is 500 MHz and is directly fed into the PLL 56. The PLL manufacturer specifies a noise performance of −80 dBc/Hz at an offset of 10 kHz from the carrier. Noise peaks are also evident at 25 kHz offset from the carrier.

Figure 4:
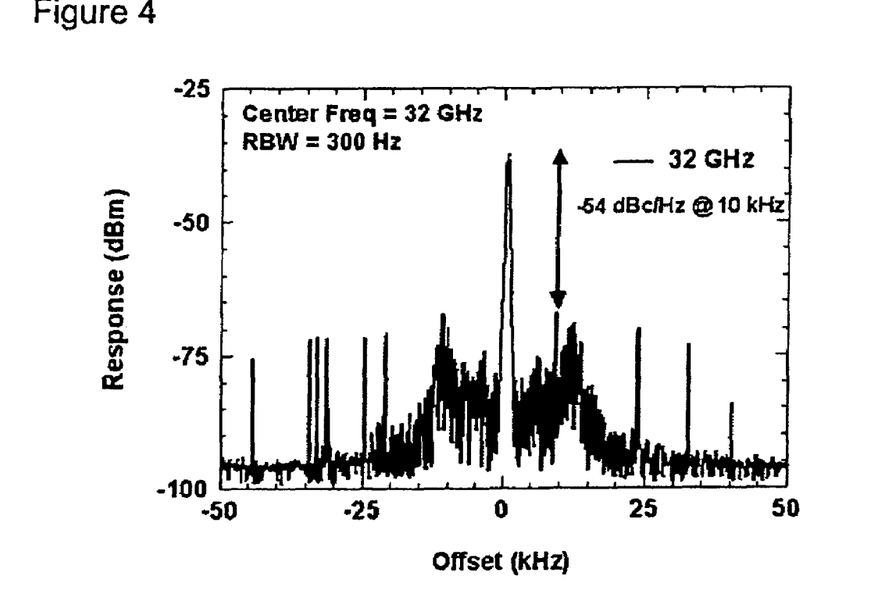
FIG. 4 shows phase locking up to 50 GHz of the first embodiment of the RF distribution system.

FIG. 4 shows phase locking up to 32 GHz with reasonable noise performance obtained with the distribution system 40.

Figure 5:
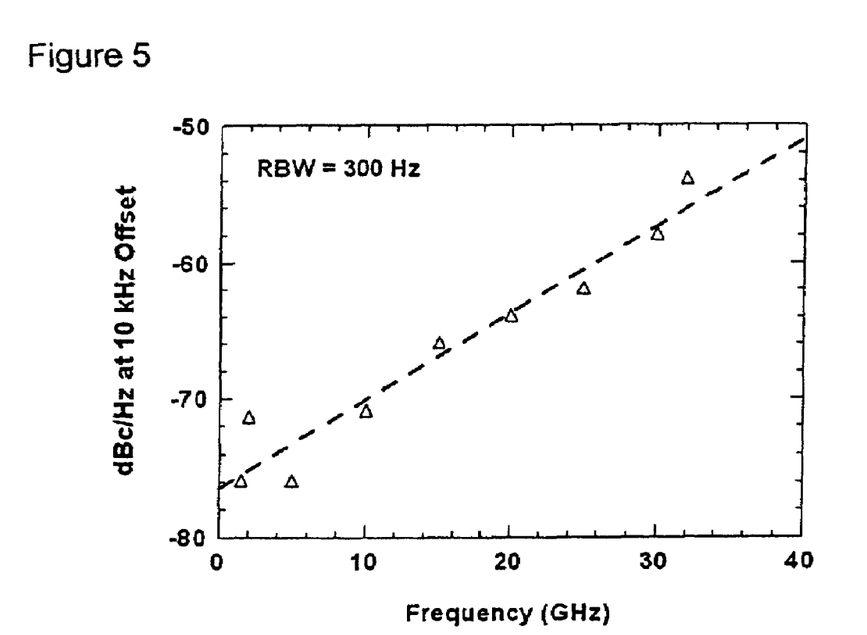
FIG. 5 illustrates the noise performance of the first embodiment of the RF distribution system for various frequencies.

The noise performance of the system 40 for various frequencies is shown in FIG. 5. As the frequency increases, the response of modulator 46 decreases which will decrease the signal to noise ratio of the tone fed back into the PLL 56. At 32 GHz, the signal in the feedback tone has degraded so much that it becomes difficult to lock the two lasers 42 and 44 at any higher frequency.

Figure 6:
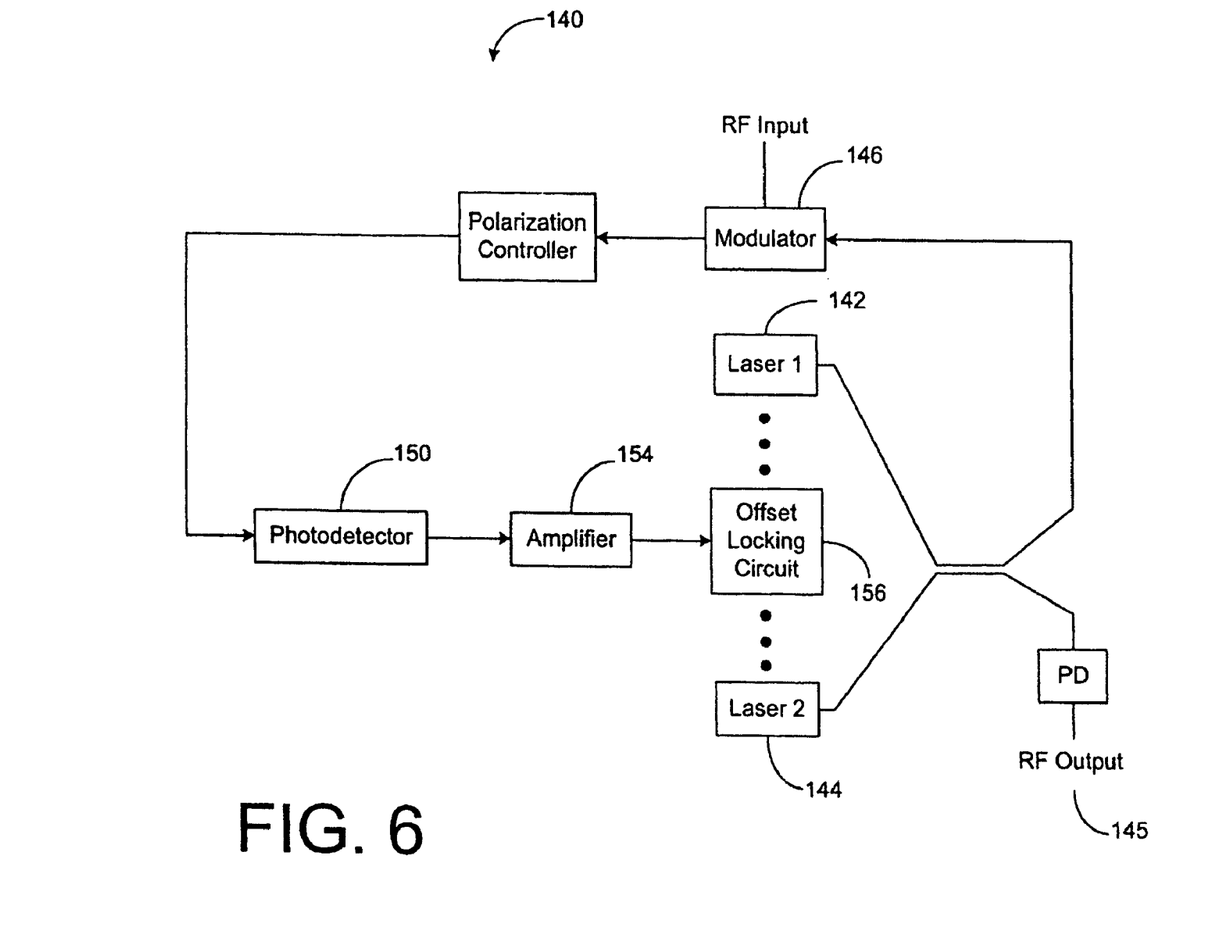
FIG. 6 illustrates a block diagram of a presently preferred embodiment of a photonic RF distribution system in accordance with the teachings of the invention.

Referring to FIG. 6, a presently preferred embodiment of an RF distribution system 140 is configured in accordance with the principles of the invention is illustrated. The RF distribution system 140 is similar to RF distribution system 40 in function with corresponding elements numbered in the range 100-199, except that in RF distribution system 140 tapped portions of lasers 42 and 44 are first combined and then coupled to modulator 146. The output of modulator 146 is coupled to the photodetector 150 through a polarization controller 149. This form of modulation will generate sidebands of laser2 142 and 144. The feedback signal will be generated by the beat frequency of the two nearest sidebands. The modulation frequency of the modulator 156 should now satisfy the following equation:

$$\tfrac{1}{2}(|V_1 - V_1| - IF)$$

By modulating tapped portions of both of the lasers 42 and 44 the required bandwidth of the synthesizer for generating the RF input and the modulator 146 are reduced by a factor of two. In the presently preferred embodiment of the system 140 a tuning range of 50 GHz is obtainable at a wavelength of 1.319 um.

Figure 7:
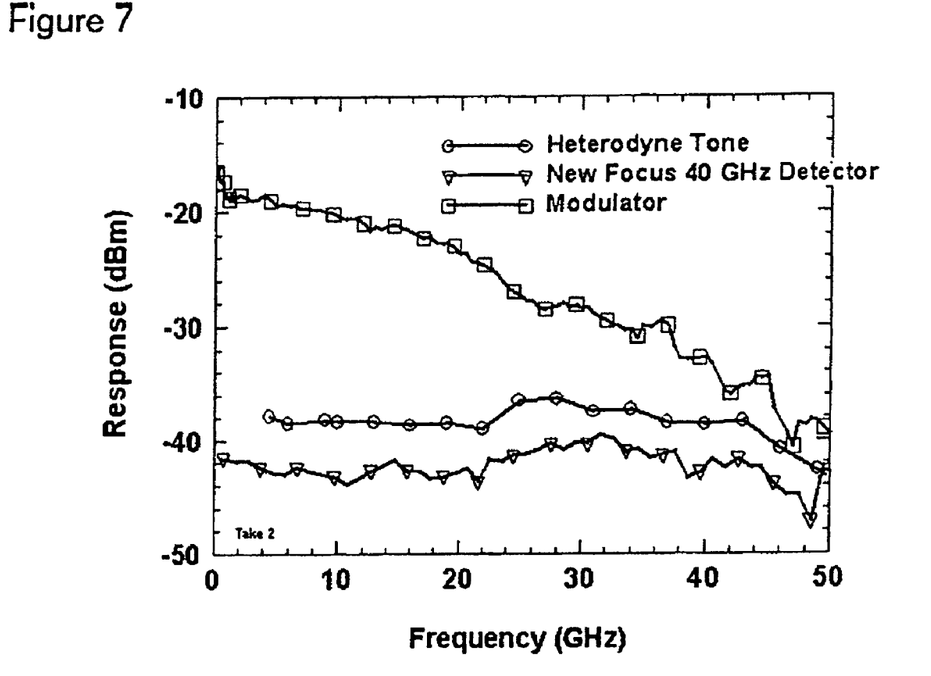
FIG. 7 illustrates the measured frequency response of the presently preferred embodiment of the RF distribution system.
Figure 8:
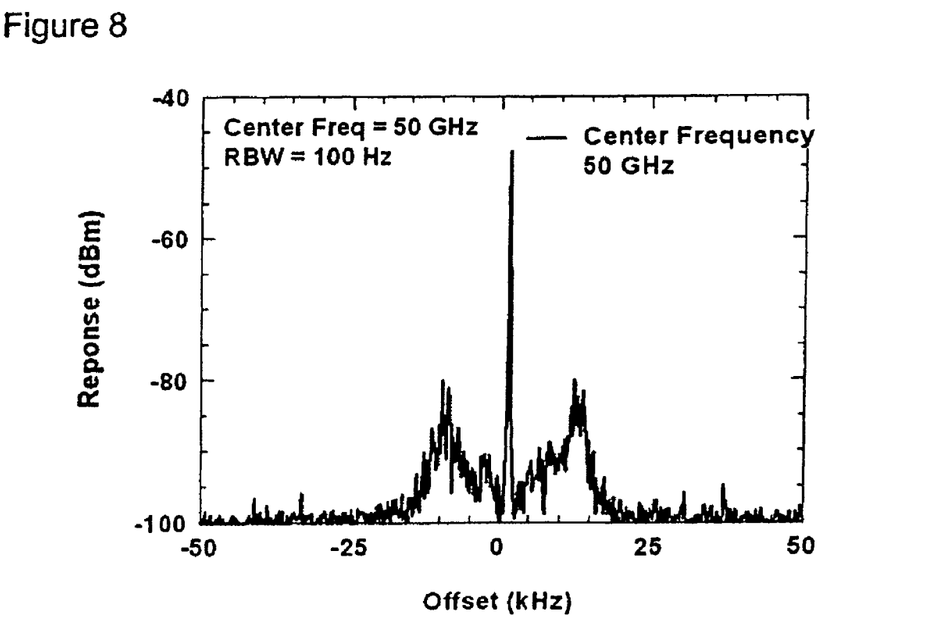
FIG. 8 shows phase locking up to 50 GHz of the presently preferred embodiment of the RF distribution system.
Figure 9:
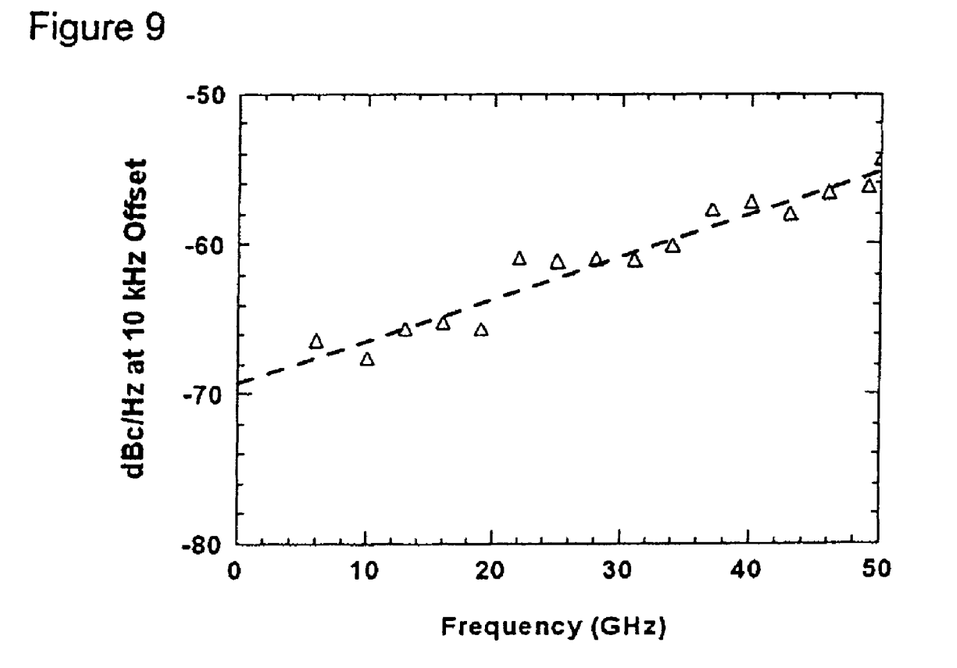
FIG. 9 illustrates the noise performance of the presently preferred embodiment of the RF distribution system for various frequencies.

The measured frequency response of the RF distribution system 140 is shown in FIG. 7. FIG. 8 shows phase locking up to 50 GHz with reasonable noise performance obtained with the distribution system 140. The noise performance of the system 140 for various frequencies is shown in FIG. 9.

The RF distribution system 40 and 140 effectively extend the frequency response of the modulator 46 from its −3 dB point to a much broader band, such as the −20 dB point. Since the PLL 56 uses only low frequency signals, less than 1 GHz for example, the loop sensitivity and dynamic range may both be increased by using various low frequency amplifiers and automatic gain control circuits. In addition, the low frequency PLL 56 may be used to compensate for loss in the modulator response. The phase locked photonic RF sources 40 and 140 may be used to distribute RF power to multiple outputs such as in photonic controlled phased array antennas.

The photonic RF generation/distribution systems 40 and 140 use an electro-optical modulator (EO modulator) 46 as a photonic mixer to extend the bandwidth of tunability in a photonic RF source, thereby providing a broadband tuning range that exceeds the wideband 3 dB response of the modulator 46. Because of the large frequency response of the EO modulator 46, the tuning range of the photonic RF source can be extended to the limit of current EO modulator and photodetector packaging technology which is presently over 110 GHz. In addition, the high dynamic range in the down converted low frequency PLL will require only a small portion of the optical power, leaving most of the optical power available for RF generation in multiple feeds.

The additional advantages of a photonic phase locked RF distribution system 40 and 140 over the conventional photonic RF link are due to the removal of the modulator in the signal path. Because the lasers can be of high power and only a small portion will be needed for the PLL, the optical power available for RF generation can be very high without any optical amplification. This can lead to higher RF gain of the distribution system and will allow more RF generation heads. Ultra-low modulation voltage, low optical insertion loss, and high optical power handling capabilities are no longer required for the modulator. The SFDR will not be limited by the transfer function of the modulator as in the conventional system, so that the modulator linearization is not needed. The photodetector will be the dominating component that will limit the gain and introduce harmonic distortions, which can be fairly small based on the development status of the high power waveguide photodetectors.

Thus it will be appreciated from the above that as a result of the present invention, a method for photonic RF generation with substantial bandwidth capability is provided by which the principal objectives, among others, are completely fulfilled. It will be equally apparent and is contemplated that modification and/or changes may be made in the illustrated embodiments without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A photonic RF distribution system for optically distributing an RF signal, comprising:
   a first optical source for generating a first optical signal having a first operating frequency;
   a second optical source for generating a second optical signal having a second operating frequency;
   an optical coupler coupled to the first optical signal for obtaining a tapped portion of the first optical signal separate from the first optical signal;
   a modulator operable to impress an RF modulation signal on the tapped portion of the first optical signal such that a modulated signal is generated;
   a first coupler for combining the modulated signal with a tapped portion of the second optical signal, thereby forming a combined signal having a difference frequency component;
   a control photodetector, responsive to the combined signal, to generate a tone signal; and
   an offset locking circuit, responsive to the tone signal, to tune the operating frequency of at least one of the optical sources such that the first optical signal and the second optical signal are frequency locked.

2. The photonic RF distribution system of claim 1 further including a second optical coupler coupled from the modulator to the second optical source for tapping the portion of the second optical signal.

3. The photonic RF distribution system of claim 1 wherein the modulator is an optically based modulator that modulates at least one light parameter of the first optical signal.

4. The photonic RF distribution system of claim 1 further including an output photodetector coupled to the first and second optical signals of the optical sources that generates an RF output.

5. The photonic RF distribution system of claim 1 wherein the offset locking circuit is a phase locked loop.

6. The photonic RF distribution system of claim 1 wherein the modulator is a Mach-Zehnder Interferometer.

7. The photonic RF distribution system of claim 1 wherein the modulator is selected from the group of intensity modulators, frequency modulators, and phase modulators.

8. The photonic RF distribution system of claim 1 wherein each of the optical sources are tunable lasers.

9. The photonic RF distribution system of claim 1 further including:
   a low noise amplifier coupled between the control photodetector and the offset locking circuit;
   an RF output coupled to the optical sources through an output photodetector;
   wherein the offset locking circuit is a phase locked loop; and
   wherein the modulator is a Mach-Zehnder Interferometer.

10. A photonic RF distribution system comprising:
    a first optical source operable to generate a first optical signal having a first operating frequency;
    a second optical source operable to generate a second optical signal having a second operating frequency;
    a first coupler for combining a tapped portion of the first optical signal with a tapped portion of the second optical signal, thereby forming a combined signal;
    a modulator receives the combined signal as an input and is operable to impress an RF modulation signal on the combined signal such that a modulated signal is generated;
    a control photodetector, responsive to the modulated signal, to generate a tone signal; and
    an offset locking circuit, responsive to the tone signal, to control the operating frequency of the optical signals such that the first optical signal and the second optical signal are frequency locked.

11. The photonic RF distribution system of claim 10 wherein the modulator is an optically based modulator that modulates at least one light parameter of the combined optical signal.

12. The photonic RF distribution system of claim 10 further including an output photodetector coupled to the first and second optical signals of the optical sources that generates an RF output.

13. The photonic RF distribution system of claim 10 wherein the offset locking circuit is a phase locked loop.

14. The photonic RF distribution system of claim 10 wherein the modulator is a Mach-Zehnder Interferometer.

15. The photonic RF distribution system of claim 10 wherein the modulator is selected from the group of intensity modulators, frequency modulators, and phase modulators.

16. The photonic RF distribution system of claim 10 wherein the optical sources are Nd:YAG lasers.

17. The photonic RF distribution system of claim 10 further including:
    a low noise amplifier coupled between the control photodetector and the offset locking circuit;
    an RF output coupled to the optical sources through an output photodetector;
    wherein the offset locking circuit is a phase locked loop; and
    wherein the modulator is a Mach-Zehnder Interferometer.

18. A method of distributing an RF output, comprising:
    generating two optical signals having an operating frequency;

obtaining a tapped portion of each of the two optical signals separate from the two optical signals:

combining the tapped portions of each of the two optical signals to form a combined signal, wherein at least one of the tapped portions is modulated by an RF signal;

detecting the phase of the combined signal;

generating a difference signal based upon the detected phase of the combined signal;

in response to the difference signal, controlling the operating frequency of the two optical signals such that the two optical signals are frequency locked;

generating the RF output based on the two optical signals.

19. The method of claim 18 further comprising amplifying the difference signal.

20. The method of claim 18 wherein the step of modulating includes modulating an intensity of the at least one of the two optical signals.

21. A photonic RF distribution system comprising:

a first optical source operable to generate a first optical signal having a first operating frequency;

a second optical source operable to generate a second optical signal having a second operating frequency;

a first coupler for generating a tapped signal of at least one of the first optical signal, the second optical signal, and a combination of the first and second optical signals, where the tapped signal is separate from the first optical signal, the second optical signal, and the combination of the first and second optical signals;

an optical modulator receives the tapped signal as an input and is operable to impress an RF modulation signal on the tapped signal such that a modulated signal is generated;

a control photodetector, responsive to the modulated signal, to generate a tone signal; and an offset locking circuit, responsive to the tone signal, to control the operating frequency of the optical signals such that the first optical signal and the second optical signal are frequency locked.

22. The photonic RF distribution system of claim 21 further including an output photodetector coupled to the optical sources that generates an RF output.

23. The photonic RF distribution system of claim 21 wherein the offset locking circuit is a phase locked loop.

24. The photonic RF distribution system of claim 21 wherein the modulator is a Mach-Zehnder Interferometer.

25. The photonic RF distribution system of claim 21 wherein the modulator is selected from the group of intensity modulators, frequency modulators, and phase modulators.

* * * * *